Nov. 16, 1937.　　　M. MORGAN ET AL　　　2,099,496
SHEARS
Filed Feb. 7, 1936　　　3 Sheets-Sheet 1

Inventors
MYLES MORGAN
JOHN N WHALEN
By Albert G. Blodgett
Attorney

Nov. 16, 1937.   M. MORGAN ET AL   2,099,496
SHEARS
Filed Feb. 7, 1936   3 Sheets-Sheet 2
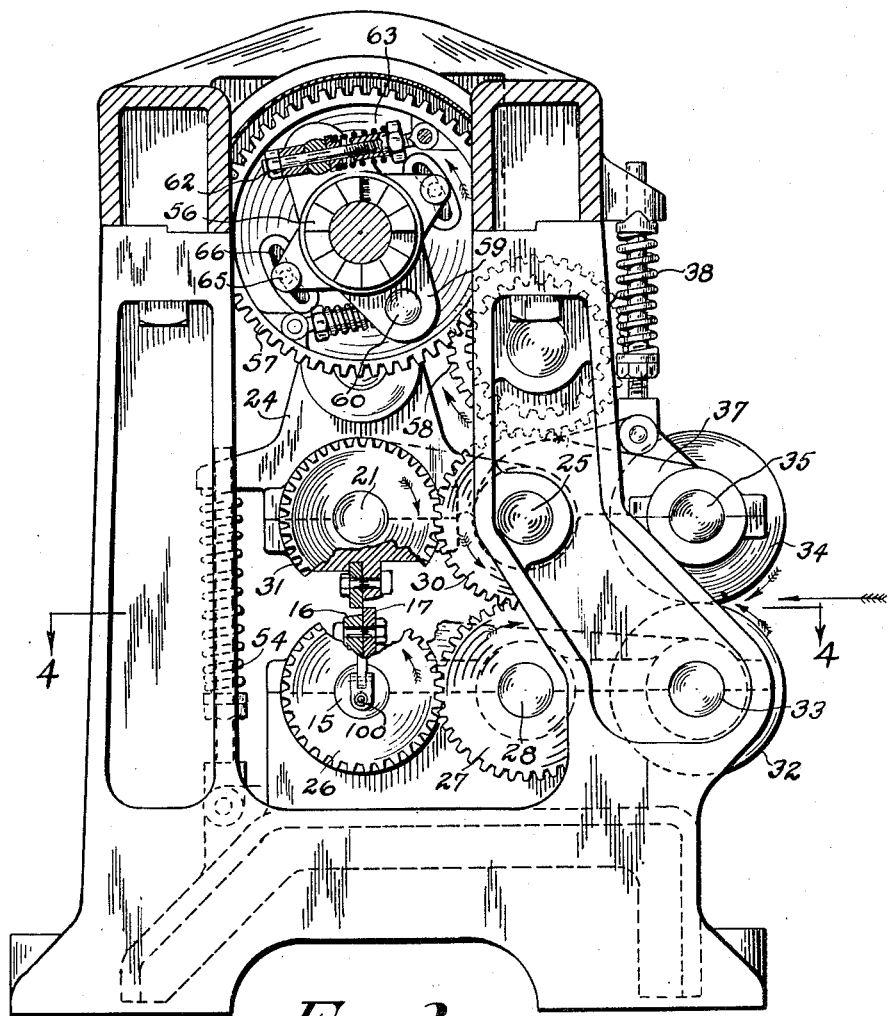
Fig. 2
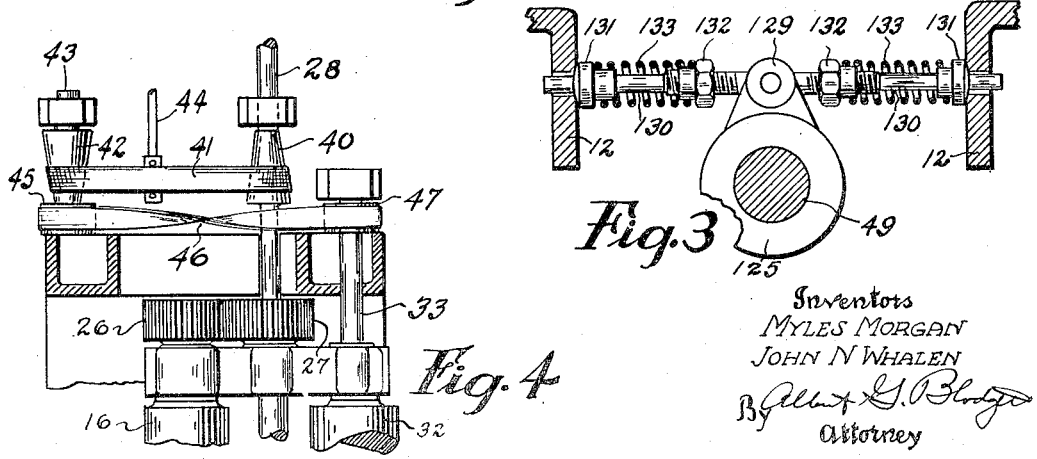
Fig. 3
Fig. 4
Inventors
MYLES MORGAN
JOHN N WHALEN
Attorney Nov. 16, 1937.   M. MORGAN ET AL   2,099,496
SHEARS
Filed Feb. 7, 1936   3 Sheets-Sheet 3
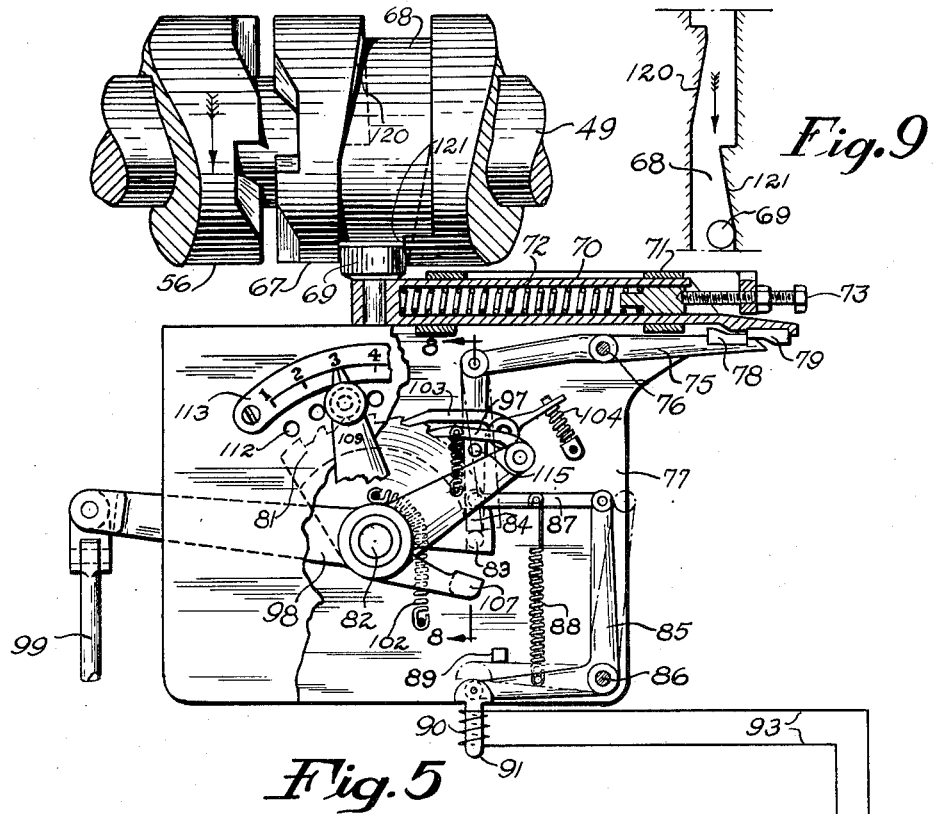
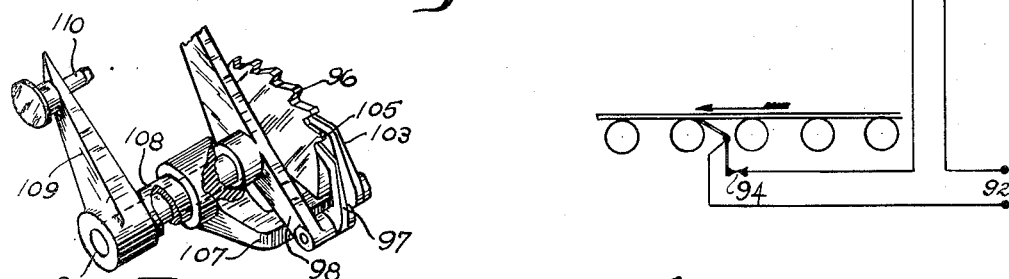
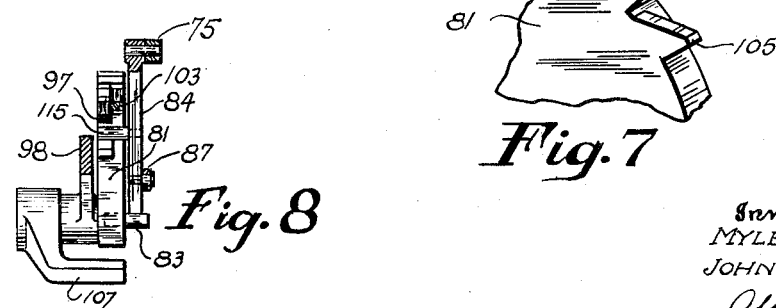
Inventors
MYLES MORGAN
JOHN N WHALEN
By Albert G. Blodgett
Attorney Patented Nov. 16, 1937

2,099,496

UNITED STATES PATENT OFFICE 2,099,496

SHEARS

Myles Morgan, Worcester, and John N. Whalen, Boylston, Mass., assignors to Morgan Construction Company, Worcester, Mass., a corporation of Massachusetts Application February 7, 1936, Serial No. 62,762

13 Claims. (Cl. 164—68)

This invention relates to shears, and more particularly to shears of the rotary type adapted to cut a rapidly moving strip of material into predetermined lengths.

Shears of this type as heretofore constructed have not proven entirely satisfactory. In some cases the shears operate properly at comparatively low speeds, but when the velocity of the material is increased the action of the shears becomes violent and unreliable. In other cases it is not possible to cut accurate lengths of the material and to vary the lengths in a desired manner.

It is accordingly the main object of the invention to provide a rotary shear which will cut a strip of material into predetermined lengths while the strip is traveling at a comparatively high speed, and to so construct the shear that the lengths of the cut pieces can be accurately controlled in a desired manner.

It is a further object of the invention to provide a rotary shear which will be comparatively simple and inexpensive to manufacture and thoroughly reliable in operation.

With these and other objects in view, as will be apparent to those skilled in the art, the invention resides in the combination of parts set forth in the specification and covered by the claims appended hereto.

Referring to the drawings illustrating one embodiment of the invention and in which like reference numerals indicate like parts, Fig. 1 is an elevation of a rotary shear viewed from the delivery side, certain parts being broken away for clearness of illustration;

Fig. 2 is an end elevation of the shear, certain parts being broken away for clearness of illustration;

Fig. 3 is a section on the line 3—3 of Fig. 1;

Fig. 4 is a fragmentary view in section on the line 4—4 of Fig. 2;

Fig. 5 is an enlarged view of a clutch and its actuating mechanism, certain parts being broken away for clearness of illustration;

Fig. 6 is a perspective view of a portion of the clutch actuating mechanism;

Fig. 7 is an enlarged perspective view of a portion of a ratchet wheel;

Fig. 8 is a section on the line 8—8 of Fig. 5; and

Fig. 9 is a developed view of the clutch collar groove.

Figure 1:
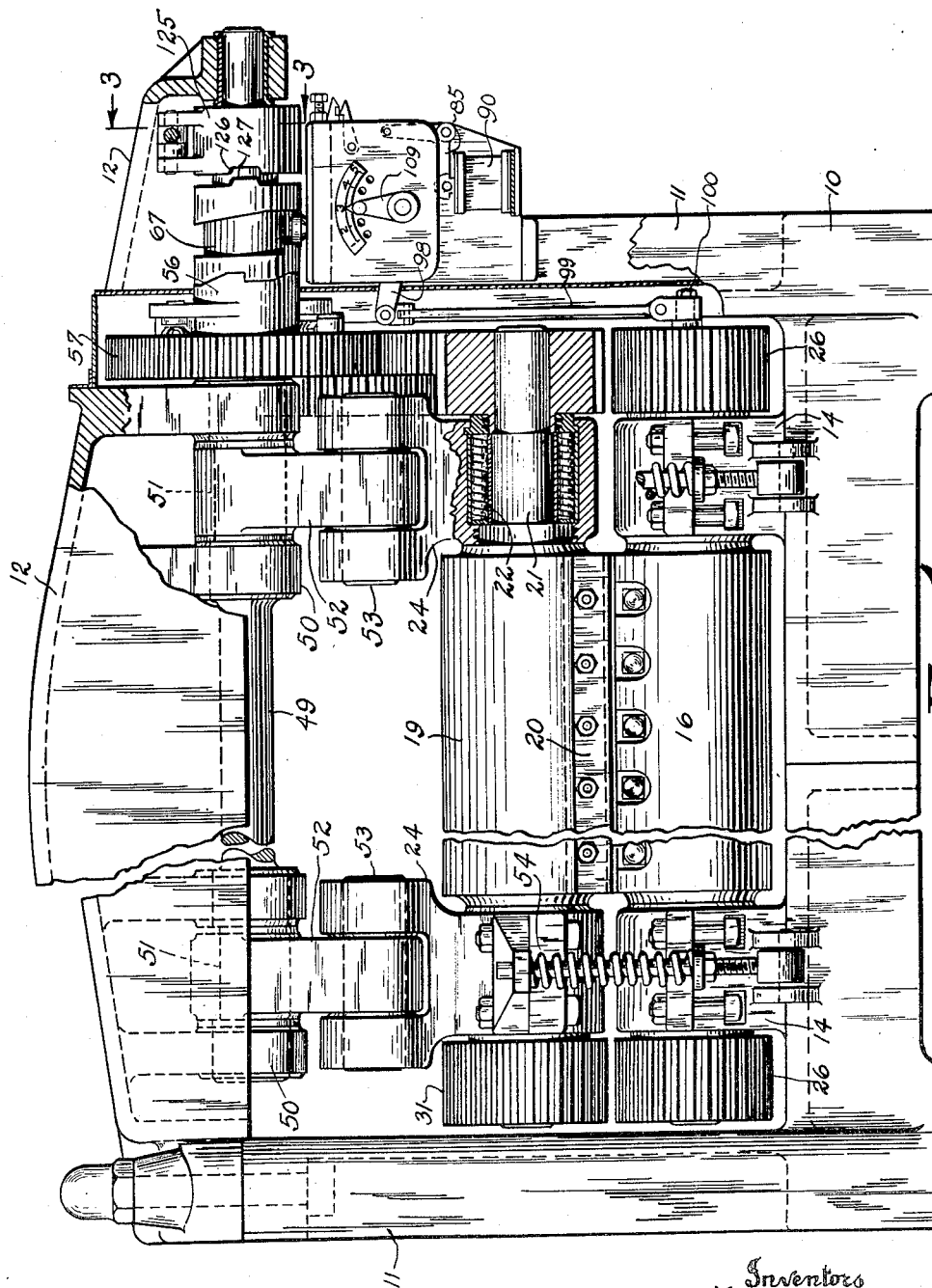

The embodiment illustrated comprises a frame 10 provided with two spaced upright portions 11 which are connected at their tops by a horizontal bridge or beam member 12. The frame 10 provides two spaced bearings 14 which support the horizontal shaft 15 of a rotatable lower cutter head 16 having a knife 17 mounted thereon. Cooperating with the cutter head 16 is an upper cutter head 19 provided with a knife 20 and having a shaft 21. This shaft 21 is supported in bearings 22 carried by members 24, these members being pivotally supported by a horizontal shaft 25 mounted in the frame.

The two cutter heads 16 and 19 are rotated at the same speed, and for this purpose a gear 26 is mounted on each end of the shaft 15 of the lower cutter head, and these gears mesh with a pair of gears 27 mounted on a horizontal shaft 28 beneath the shaft 25. The gears 27 mesh with a pair of gears 30 mounted on the shaft 25, and the gears 30 mesh with a pair of gears 31 mounted on the ends of the shaft 21 of the upper cutter head. With this construction the member 24 can swing about the shaft 25 to bring the upper head into or out of cutting position, and during such swinging movement the gears 30 and 31 will remain in proper meshing relationship.

In order to feed the material through the shear, we have shown a lower pinch roll 32 having a horizontal shaft 33 supported in the frame 10. This lower roll 32 cooperates with an upper pinch roll 34 having a horizontal shaft 35 supported at each end on a member 37. This member 37 is pivotally supported by the shaft 25. Springs 38 (Fig. 2) are provided to assist gravity in forcing the members 37 and the upper pinch roll downwardly so that the stock may be gripped between the rolls.

The pinch rolls and the cutter heads are rotated at a desired rate of speed, and provision is made for varying the speed of the pinch rolls (which determines the velocity of the material) in relation to the speed of the cutter heads. In the embodiment illustrated the shaft 28 is extended at one end as shown in Fig. 4, and a conical pulley 40 is mounted thereon. The pulley 40 is connected by means of a belt 41 to a conical pulley 42 mounted on a countershaft 43. The shaft 28 is driven by any suitable source of power. By varying the position of the belt 41 by means of a suitable shifting device 44, the speed of the countershaft 43 relative to that of the cutter head can be varied as desired in a well-known manner. The countershaft is provided with a pulley 45 which is connected by means of a crossed belt 46 to a pulley 47 mounted on the shaft 33 of the lower pinch roll.

The upper cutter head is moved to and fro with respect to the lower cutter head so that the material will be sheared after a predetermined number of revolutions of the cutter heads. For this purpose a horizontal shaft 49 is rotatably mounted in bearings 50 carried by the bridge member 12. The shaft 49 is provided with two eccentrics 51 which are connected to the members 24 by means of connecting rods 52 and wrist pins 53. Springs 54 serve to support a portion of the weight of the members 24 and the upper cutter head, thus increasing the smoothness of operation.

The eccentric shaft 49 is given an intermittent rotation in timed relation with the rotation of the cutter heads, and for this purpose we preferably utilize a positive clutch mechanism which is engaged and disengaged automatically. The construction illustrated comprises a toothed clutch member 56 rotatably supported on the shaft 49 and driven by means of a gear 57 which is likewise rotatably supported on the shaft 49. The gear 57 is connected to the gear 30 by means of a compound gear 58. In order to avoid shock in the operation of the shear, a suitable cushioning mechanism is provided to connect the gear 57 to the clutch member 56. For this purpose the member 56 is formed with two outwardly projecting lugs 59 (Fig. 2) each of which supports a pivot pin 60. Bolts 62 are connected at one end to the gear 57 and at the other end they are slidable through the pins 60. Compression springs 63 surround the bolts 62 and serve to transmit power from the gear 57 to the clutch member. The clutch member is held against the gear 57 by means of bolts 65 which extend through arcuate slots 66 in the gear, these bolts being loose enough to permit relative angular movement between the parts.

A toothed clutch collar 67 is slidably keyed to the shaft 49, and means is provided to slide this collar into and out of engagement with the clutch member 56. For this purpose the collar is formed with a circumferential groove 68 to receive a roller 69 which is mounted on a hollow plunger 70. The plunger is slidably supported in a guideway 71 for reciprocating movement in a direction parallel to the axis of the shaft 49. A coiled compression spring 72 is mounted within the plunger to urge it in the proper direction to cause clutch engagement, the spring being supported at one end by an adjustable screw 73. Movement of the plunger under the influence of this spring is normally prevented by a latch lever 75 pivotally supported by a pin 76 on a frame 77, this latch lever having a trigger block 78 mounted thereon to engage a catch 79 on the plunger.

In order to release the latch 75 at predetermined intervals, we provide a suitable timing mechanism comprising a ratchet plate 81 pivotally mounted on a stud 82 carried by the frame 77. This ratchet plate carries a suitable abutment in the form of a pin 83 which is arranged to engage the lower end of a bar 84, this bar being pivotally attached at its upper end to the latch lever 75. These parts are so arranged that when the pin 83 strikes the bar 84, it will lift the bar and swing the latch lever, releasing the catch 79 and allowing the spring 72 to throw the clutch into engagement. Means is preferably provided to prevent this action when no stock is passing through the shear, and for this purpose we provide a bell crank lever 85 pivotally supported on the frame 77 by means of a pin 86 and connected to the bar 84 by a link 87. A tension spring 88 is connected at one end to the bell crank lever and tends to hold it against a stop 89 on the frame 77, as indicated by the broken lines in Fig. 5, thus holding the bar 84 out of the path of the pin 83. This tendency of the spring 88 may be overcome by means of a solenoid 90 having a plunger 91 connected to the bell crank lever 85. The solenoid is connected to a source of electric current 92 by means of conductors 93 and a switch 94, the latter being closed automatically by the stock as it approaches the shear. The other end of the spring 88 may be connected to the link 87, thus applying a yielding force to the bar 84 and latch lever 75.

The ratchet plate 81 is arranged to be advanced pivotally about the stud 82 with a step by step movement in timed relation with the rotations of the cutter heads. In the embodiment illustrated the ratchet plate is formed with a series of teeth 96 which are engaged by a pawl 97 mounted on one end of a lever 98, this lever being pivotally supported on the stud 82. The other end of the lever is connected by means of a connecting rod 99 to a crank pin 100 on the end of the lower cutter head shaft 15. With this construction, the pawl 97 will oscillate and advance the ratchet plate one tooth for each revolution of the cutter head. A coiled tension spring 102 is connected to the ratchet plate and tends to move it in the reverse direction, but such reverse movement is prevented by means of a holding pawl 103 mounted on the frame 77 close to the pawl 97 and likewise engaging the teeth 96. This holding pawl is held against the ratchet plate by a coiled compression spring 104. As shown particularly in Fig. 7, the last tooth 105 on the ratchet plate is made narrower than the rest, so that it will be engaged only by the pawl 97 and not by the holding pawl. The purpose of this construction will be made clear hereinafter.

In order to vary the number of revolutions of the cutter heads between successive engagements of the clutch, we provide means to vary the distance through which the ratchet plate 81 must be moved before the pin 83 will strike the bar 84. For this purpose, the pawls are released at each clutch engagement, and the spring 102 serves to swing the ratchet plate in a clockwise direction as viewed in Fig. 5 until it strikes an adjustable stop formed by an arm 107. This arm is mounted on a quill 108 supported on the stud 82. At the front end of the quill there is provided a pointer 109 having a pin 110 adapted to be inserted in any one of a series of holes 112 in the frame 77. An index plate 113 is mounted on the frame and provided with suitable numerals which correspond to the respective holes 112.

The pawls 97 and 103 are lifted at each clutch engagement by suitable automatic means. In the preferred construction illustrated we provide the bar 84 with a pin 115 which extends beneath the pawls, and we form the catch 79 and the trigger block 78 with cooperating surfaces so shaped that as the plunger 70 is moved to the left by the spring 72 the catch 79 will force the trigger block 78 downwardly. This will tip the lever 75 and raise the bar 84, bringing the pin 115 into contact with the pawls and lifting them out of engagement with the ratchet teeth. The spring 102 will thereupon immediately bring the ratchet plate against the stop 107.

In order to disengage the clutch after one revolution of the shaft 49, the groove 68 in the clutch collar is provided on opposite sides with cam surfaces 120 and 121. During the first half revolution of the shaft 49 and clutch collar 67, immediately following clutch engagement, the cam surface 120 will engage the roller 69 and force the plunger 70 to the right against the spring 72 until the catch 79 is locked by the trigger 78. Thereupon during the second half revolution of the shaft and clutch collar, the cam surface 121 will engage the roller 69, which is now held in a fixed position, and the clutch collar will be withdrawn axially from engagement with the clutch member 56.

It is desirable to provide a positive stop for the eccentric shaft 49 so that the shaft will come to rest in a predetermined position following the release of the clutch. For this purpose a collar 125 (Fig. 1) is supported upon the shaft 49 adjacent to the clutch collar 67 and at the opposite side thereof from the clutch member 56. The collar 125 is provided with notches 126 adapted to receive lugs 127 on the adjacent face of the collar 67, when the latter is thrown to the right by the action of the roller 69 and cam surface 121. The collar 125 is held against rotation, but in order to avoid shock we preferably employ a yielding means for this purpose. As shown particularly in Fig. 3, the collar 125 is formed with a lug 129 to which are pivotally secured two rods 130 extending in opposite directions and slidably supported in sleeves 131 which bear against the bridge member 12. Each rod 130 is provided with a nut 132, and a coiled compression spring 133 surrounds each rod between the corresponding nut 132 and sleeve 131. The springs 133 permit a slight yielding of the collar 125 when the lugs 127 engage the notches 126, and thus prevent excessive stresses in the various parts.

The gears through which rotation is imparted to the gear 57 are preferably so proportioned as to rotate the gear 57 at a slower speed than the cutter heads. This makes it possible to operate the shear at high speeds, and yet the clutch and associated parts will function smoothly. In the preferred construction, the gear 57 rotates at exactly one-half the speed of the cutter heads. With this two-to-one ratio the clutch member 56 and clutch collar 67 should each have a number of clutch teeth which is divisible by two. In the embodiment illustrated, four clutch teeth are provided on each of these parts. If a three-to-one ratio is used, the number of teeth on each of these parts should be three or a multiple thereof. Whatever the ratio may be, the number of clutch teeth should be equally divisible thereby. The various parts are of course so coordinated that the knives 17 and 20 will be together when the eccentrics 51 and the upper cutter head 19 reach their lowermost positions.

The operation of the invention will now be apparent from the above disclosure. The shaft 28 is rotated by a suitable source of power, and the gears 27 thereon serve to drive the gears 26, 30 and 31 and the cutter heads 16 and 19. The speed of the shaft is selected to give the knives 17 and 20 a velocity approximately equal to the desired velocity of the material to be sheared. The lower pinch roll 32 is driven by means of the belts 41 and 46 and their associated pulleys. The peripheral velocity of this roll determines the velocity of the material, and this may be varied by adjusting the belt 41 laterally with respect to the pulleys 40 and 42 in a well known manner. The gear 57 rotates continuously at one-half the speed of the cutter heads. With no stock passing through the shear, the switch 94 will be open, the solenoid 90 will be de-energized, and the spring 88 will hold the bar 84 out of the path of the pin 83, and the clutch collar 67 will be held out of engagement with the rotating clutch member 56 by the trigger 78 and the catch 79. The lever 98 and pawl 97 will be oscillated continuously by the action of the revolving crank-pin 100 and the connecting rod 99, and this pawl by engagement with the tooth 105 will impart a similar oscillation to the ratchet plate 81. The holding pawl 103 will not interfere with the oscillation of the ratchet plate, since the tooth 105 is too narrow to engage the holding pawl. The pointer 109 will be held fixed by engagement of the pin 110 in one of the holes 112, corresponding to the desired length of the sheared pieces and the number of revolutions of the cutter heads required between cuts.

As the front end of the stock approaches the shear, it will close the switch 94 and energize the solenoid 90. This will pull downwardly on the plunger 91 and tend to rock the bell crank lever 85 and force the bar 84 to the left in Fig. 5. Such movement of the bar will occur as soon as the oscillation of the ratchet plate 81 carries the pin 83 to its lowest position, and on the ensuing upward movement of this pin the bar will be lifted, rocking the lever 75 and releasing the catch 79. The spring 72 will immediately force the plunger 70 to the left, bringing the collar 67 into engagement with the rotating clutch member 56. During this movement, the catch 79 will force the trigger 78 downwardly, rocking the lever 75 even further and lifting the bar 84 until the pin 115 strikes the pawls 97 and 103, lifting these pawls above the ratchet teeth. The spring 102 will immediately turn the ratchet plate 81 in a clockwise direction until it strikes the stop 107.

Immediately following the clutch engagement, the eccentric shaft 49 will rotate with the gear 57, and the connecting rods 52 will move downwardly, swinging the members 24 downwardly about the shaft 25. This will lower the upper cutter head 19, and the knives 17 and 20 will cut a short piece or "crop" from the front end of the stock, which in the meantime has passed between the pinch rolls 32 and 34 and entered the space between the cutter heads. During the first half revolution of the eccentric shaft, the cam surface 120 on the clutch collar will force the roller 69 and plunger 70 to the right in Fig. 5, causing the catch 79 to be once more retained by the trigger 78. During the second half-revolution of the eccentric shaft, the cam surface 121 will engage the roller 69 and the clutch collar will be forced to the right out of engagement with the member 56 and into engagement with the collar 125. As the lugs 127 enter the notches 126, the clutch collar 67 and the eccentric shaft 49 will be brought to a stop with the upper cutter head in its raised position, and shock being absorbed by the springs 133.

The cutter heads will of course continue to rotate, and at each rotation the oscillating pawl 97 will advance the ratchet plate 81 one tooth in a counter-clockwise direction, reverse movement of the plate being prevented by the holding pawl 103. After a predetermined number of rotations, dependent upon the position of the pointer 109 and stop 107, the pin 83 will again engage the lower end of the bar 84. This will cause a second engagement of the clutch and a second cutting of the stock, and the cycle will be repeated as long as stock is delivered to the shear.

Coarse adjustments in the length of the pieces cut can be made by changing the position of the pointer 109, thus varying the number of revolutions of the cutter heads between consecutive engagements of the clutch. Fine adjustments in length can be made by changing the position of the belt 41, thus varying the speed of stock travel, as determined by the pinch roll 32, relative to the speed of the cutter heads. It has been found that an appreciable variation in this relative speed is possible without detrimentally affecting the cutting action.

It will be noted that since the member 24, which supports the upper head, is pivoted about the axis of the gear 30, this gear remains in proper mesh with the gear 31 on the cutter head at all times. This contributes greatly to smooth and accurate operation.

Having thus described our invention, what we claim as new and desire to secure by Letters Patent is:

1. A shearing mechanism comprising a frame, a member supported for movement in the frame, a cutter head rotatably mounted in the member, means including an eccentric rotatably mounted in the frame to impart movement to the member and thereby move the cutter head, means to rotate the cutter head continuously, means including a clutch to rotate the eccentric, and means to engage and disengage the clutch in timed relation with the rotation of the cutter head.

2. A shearing mechanism comprising a frame, a member supported for movement in the frame, a cutter head rotatably mounted in the member, means including an eccentric rotatably mounted in the frame to impart movement to the member and thereby move the cutter head, means to rotate the cutter head continuously, means including a positive-type clutch to rotate the eccentric, means to engage and disengage the clutch in timed relation with the rotation of the cutter head, and means providing a positive stop for the eccentric following each disengagement of the clutch.

3. A shearing mechanism comprising a frame, a member supported for movement in the frame, a cutter head rotatably mounted in the member, means including an eccentric rotatably mounted in the frame to impart movement to the member and thereby move the cutter head, means to rotate the cutter head continuously, means including a clutch to rotate the eccentric, means to engage the clutch after a predetermined number of revolutions of the cutter head, and means to disengage the clutch after each revolution of the eccentric.

4. A shearing mechanism comprising a frame, a member supported for movement in the frame, a cutter head rotatably mounted in the member, means including an eccentric rotatably mounted in the frame to impart movement to the member and thereby move the cutter head, means to rotate the cutter head continuously, means including a clutch to rotate the eccentric, and an adjustable timing mechanism operating at a definite speed relationship with the cutter head and arranged to engage and disengage the clutch at predetermined intervals.

5. A shearing mechanism comprising a frame, a member supported for movement in the frame, a cutter head rotatably mounted in the member, means including an eccentric rotatably mounted in the frame to impart movement to the member and thereby move the cutter head, means to rotate the cutter head continuously, means including a clutch to rotate the eccentric, a movable device effective when in a certain position to cause clutch engagement, and means to advance said device step by step toward said position in timed relation with the rotation of the cutter head.

6. A shearing mechanism comprising a frame, a member supported for movement in the frame, a cutter head rotatably mounted in the member, means including an eccentric rotatably mounted in the frame to impart movement to the member and thereby move the cutter head, means to rotate the cutter head continuously, means including a clutch to rotate the eccentric, a ratchet plate effective when in a certain position to cause clutch engagement, and an oscillating pawl to advance the ratchet plate step by step toward said position in timed relation with the rotation of the cutter head.

7. A shearing mechanism comprising a frame, a member supported for movement in the frame, a cutter head rotatably mounted in the member, means including an eccentric rotatably mounted in the frame to impart movement to the member and thereby move the cutter head, means to rotate the cutter head continuously, means including a clutch to rotate the eccentric, a ratchet plate effective when in a certain position to cause clutch engagement, an oscillating pawl to advance the ratchet plate step by step toward said position in timed relation with the rotation of the cutter head, a holding pawl to prevent reverse movement of the ratchet plate, yieldable means tending to produce reverse movement of the ratchet plate, and means to lift both pawls out of contact with the ratchet plate after each engagement of the clutch.

8. A shearing mechanism comprising a frame, a member supported for movement in the frame, a cutter head rotatably mounted in the member, means including an eccentric rotatably mounted in the frame to impart movement to the member and thereby move the cutter head, means to rotate the cutter head continuously, means including a clutch to rotate the eccentric, a ratchet plate effective when in a certain position to cause clutch engagement, an oscillating pawl to advance the ratchet plate step by step toward said position in time relation with the rotation of the cutter head, a holding pawl to prevent reverse movement of the ratchet plate, yieldable means tending to produce reverse movement of the ratchet plate, an adjustable stop to limit reverse movement of the ratchet plate, and means to lift both pawls out of contact with the ratchet plate after each engagement of the clutch and thus permit the yieldable means to return the ratchet plate to the position determined by said stop.

9. A shearing mechanism comprising a frame, a member supported for movement in the frame, a cutter head rotatably mounted in the member, means including an eccentric rotatably mounted in the frame to impart movement to the member and thereby move the cutter head, means to rotate the cutter head continuously, means including a clutch to rotate the eccentric, a ratchet plate having a series of teeth, an abutment movable with the ratchet plate, a device adapted to be engaged by the abutment when the ratchet plate reaches a predetermined position and arranged to cause engagement of the clutch, means whereby engagement of the abutment with the device may be prevented, an oscillating pawl engaging the ratchet teeth and arranged to advance the ratchet plate step by step toward said predetermined position in timed relation with the rotation of the cutter head, yieldable means tending to produce reverse movement of the ratchet plate, and a holding device to prevent reverse movement of the ratchet plate, said holding device being ineffective to prevent the ratchet plate from oscillating with the pawl after the pawl has reached the last tooth on the ratchet plate.

10. A shearing mechanism as covered by claim 9 in which the holding device is in the form of a pawl arranged to engage the ratchet teeth, the last ratchet tooth being narrower than the rest so that it will not be engaged by the holding pawl.

11. A shearing mechanism comprising a frame, a member supported for movement in the frame, a cutter head rotatably mounted in the member, means including an eccentric rotatably mounted in the frame to impart movement to the member and thereby move the cutter head, means to rotate the cutter head continuously, means including a toothed clutch to rotate the eccentric, the clutch having a driven part and a driving part, means to rotate the driving part, the speed of the cutter head having a predetermined ratio to the speed of the driving part and the number of teeth on the clutch being equally divisible by said ratio, and means to engage and disengage the clutch in timed relation with the rotation of the cutter head.

12. A shearing mechanism as covered by claim 11 in which the driving part is rotated at one half the speed of the cutter head.

13. A shearing mechanism comprising a frame, a member supported for movement in the frame, a cutter head rotatably mounted in the member, means including an eccentric rotatably mounted in the frame to impart movement to the member and thereby move the cutter head, means to rotate the cutter head continuously, means including a clutch to rotate the eccentric, means responsive to the approach of stock to the shearing mechanism and effective to produce clutch engagement and thus cause the cutter head to move and cut a short piece from the front end of the stock, and means to disengage and engage the clutch in timed relation with the rotation of the cutter head while stock is passing through the shearing mechanism and thereby shear predetermined lengths from the remainder of the stock.

MYLES MORGAN.
JOHN N. WHALEN.